United States Patent [19]

Schlick

[11] 4,088,269
[45] May 9, 1978

[54] ELECTRICALLY HEATED WINDSHIELD WASHER SPRAY NOZZLE ASSEMBLY

[75] Inventor: Horst Schlick, Schwalbach, Germany

[73] Assignee: VDO Adolf Schindling AG, Frankfurt am Main, Germany

[21] Appl. No.: 595,326

[22] Filed: Nov. 6, 1975

[51] Int. Cl.² .......................... B60S 1/52; H05B 1/00; B67D 5/62; B05B 1/24

[52] U.S. Cl. ................................ 239/133; 15/250.05; 137/341; 219/203; 219/301; 219/505; 222/146 HE; 239/284 R

[58] Field of Search ............. 219/301, 504, 505, 214, 219/202, 203; 15/250.01-250.05, 250; 239/13, 128, 130–135, 284, 284 R; 137/341; 401/1, 2; 165/41; 98/2.1; 222/146 R, 146 HE, 146 HA

[56] References Cited

U.S. PATENT DOCUMENTS

| | | | |
|---|---|---|---|
| 2,861,163 | 11/1958 | Asakawa | 219/504 UX |
| 3,014,251 | 12/1961 | Stern | 98/2.1 |
| 3,144,174 | 8/1964 | Abplanalp | 219/301 UX |
| 3,243,753 | 3/1966 | Kohler | 219/241 UX |
| 3,319,891 | 5/1967 | Campbell | 219/203 X |
| 3,338,476 | 8/1967 | Marcoux | 219/505 X |
| 3,662,149 | 5/1972 | Lipimski | 219/505 X |

FOREIGN PATENT DOCUMENTS

| | | | |
|---|---|---|---|
| 1,804,576 | 5/1970 | Germany | 239/284 |
| 2,245,910 | 4/1974 | Germany | 239/284 |
| 960,974 | 6/1964 | United Kingdom | 15/250.01 |

*Primary Examiner*—A. Bartis
*Attorney, Agent, or Firm*—Otto John Munz

[57] ABSTRACT

An electrically heated spray nozzle assembly is mounted upon a vehicle in position to direct a fluid spray onto the windshield thereof. The spray nozzle assembly includes a hollow angled pipe having a fluid inlet at one end and a spray nozzle at its other end. The pipe is enclosed in a housing made of heat insulating thermoplastic material. A PTC heating element is mounted in the housing below the nozzle, contiguous to and in heat exchange with the nozzle and the pipe. The housing is circumferentially grooved for releasable engagement with the rim of an opening in the hood of the vehicle. The PTC heating element has its temperature-resistance curve rising sharply at or about 0° C with its steepest portion below 50° C.

1 Claim, 2 Drawing Figures

ELECTRICALLY HEATED WINDSHIELD WASHER SPRAY NOZZLE ASSEMBLY

FIELD OF THE INVENTION

The invention relates to a spray nozzle for windshield washing devices of motor vehicles with an appurtenant electric heating device.

DESCRIPTION OF THE PRIOR ART

Spray nozzles already are known which provide on the pipe connection for the feed hose a filament winding connected directly or by way of a switch, to the power supply circuit of the motor vehicle. Such a filament winding prevents an ice formation in the nozzle orifice of the spray nozzle at temperatures near or below the freezing point, caused by cold-air flow during the travel, and the clogging of the nozzle. Such electrically heatable spray nozzles present considerable disadvantage in that they increase substantially the total load of the power supply voltage source which, due to a multiplicity of other simultaneously electrically operated devices frequently approaches the limiting load. For this reason such spray nozzles did not meet with success in practice.

In another known spray nozzle, bores are provided in the tip of the nozzle, through which the heated air flows from the space under the hood of the vehicle to the outside. This device does prevent ice formation in the orifice of the nozzle and avoids an additional load upon the power-supply voltage-source, creates, however, the danger that, for instance when the exhaust manifold leaks, poisonous gases may escape from the space under the hood through the bores and subsequently enter the passenger compartment through the adjacent fresh-air ventilation inlets thereof. Therefore such spray nozzles have not succeeded either.

Spray nozzles also are known which provide as the heating device a resistance in the electric circuit of the motor vehicle, for instance a resistance located in the device that controls the light-generating dynamo. Such a heating device avoids an additional load of the power supply voltage source. It presents, however, the disadvantage that, especially in vehicles with a rear engine drive, long electric connection lines must be provided. This affects unfavorably the assembly cost of such a heating device. Furthermore, the substantial dimensions of the resistors usable for the heating device result in an undesirable enlargement of the structural volume of the spray nozzle.

SUMMARY OF THE INVENTION

The objects of the invention are to provide: a spray nozzle with a heating device whose structural volume is not at all, or only slightly, larger than that of a non-heated spray nozzle, which has the power voltage supply source loaded as little as possible and whose assembly can be carried out at the smallest possible expense in electric installation material and labor.

Another object of the invention is to provide in the heating device at least one PTC heating element.

DESCRIPTION OF THE PREFERRED EMBODIMENT

A cold conductor or PTC heating element has at low ambient temperatures an extremely low resistance which at rising ambient temperatures rapidly rises to very high values. When the PTC heating element is fed a constant or nearly constant operating voltage, a large current flows therefor throughout it at low ambient temperatures, and a small current at high ambient temperatures. Consequently, the PTC heating element produces at temperatures near or below the freezing point a high power loss by which in accordance with the invention the nozzle is heated and therefore kept free from ice. At higher temperatures, however, only a small power loss occurs in the PTC heating element, so that the load of the power supply circuit remains limited to a minimum. Due to the small external dimensions of the PTC heating element, the structural volume of the spray nozzle thus heated is only slightly larger than that of a non-heated spray nozzle, and considerably smaller than that of the known heatable spray nozzles. Since the connection to the PTC heating element to the power supply circuit can be carried out at any point, the expense in electric installation and material are kept within narrow limits.

Figure 1:
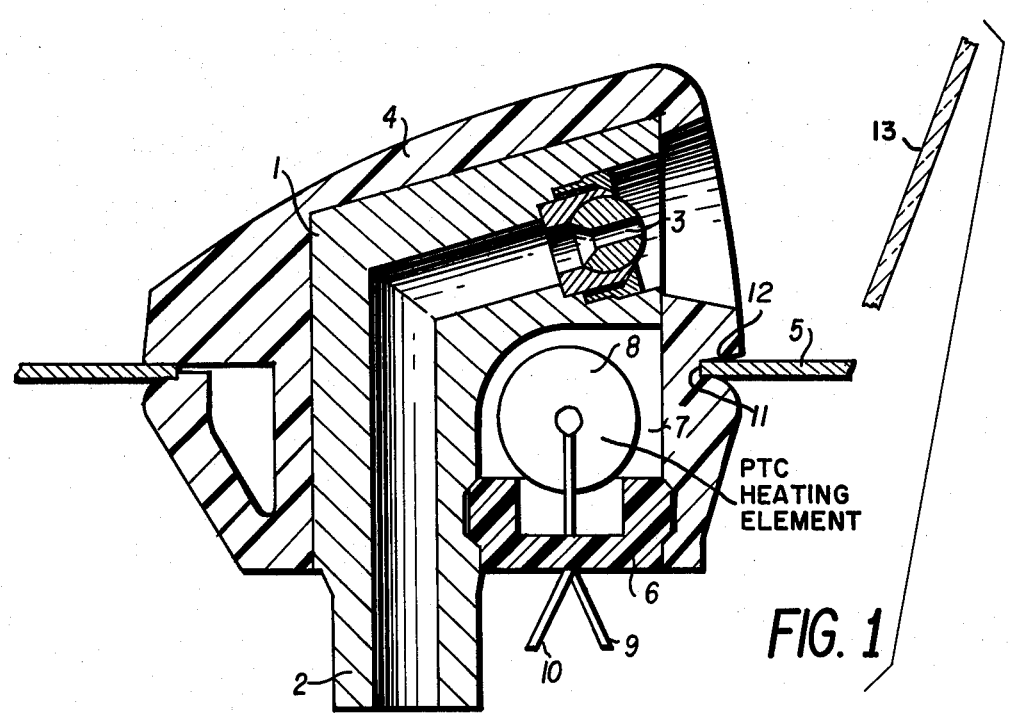
FIG. 1 of the drawings is a cross-sectional view partly diagrammatical of the device of the invention.
Figure 2:
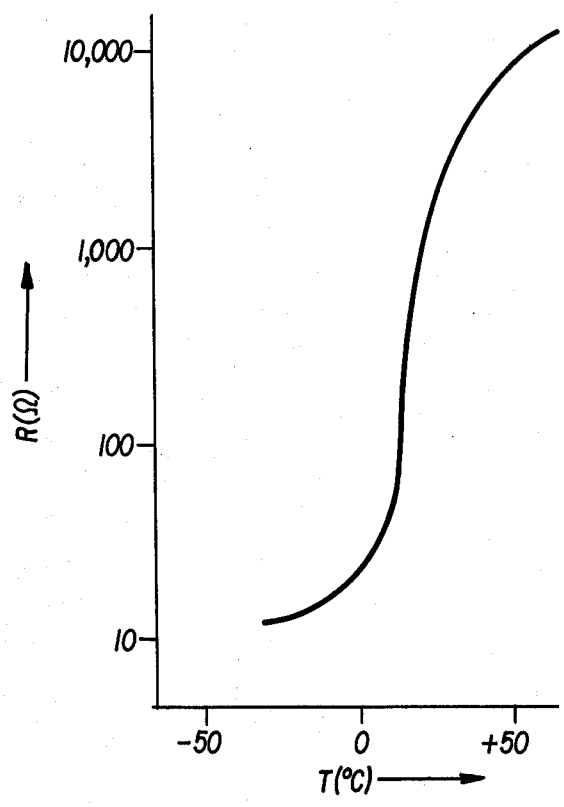
FIG. 2 represents a steep resistance-temperature characteristic curve.

In accordance with the invention a PTC heating element is provided whose bend in the resistance-temperature characteristic curve is positioned below the temperature freezing point. In such an instance the power supply circuit is loaded to a particularly slight degree at higher temperatures. For the same reason it is advisable to employ a cold conductor with a steep resistance-temperature characteristic curve. FIG. 2 is a graph wherein ordinates and abscissas represent to scale, ohmic resistance of a suitable PTC heating element, and ambient temperature, respectively. From the curve it is noted that at about 0° C the curve rises sharply to about 50° C, at which latter temperature its rate of increase decreases so that its steepest portion lies between about 0° and 50° C.

A further decrease in the load of the power supply circuit by the heating device is accomplished by enveloping the spray nozzle and the cold conductor with a heat-insulating plastic casing.

The spray nozzle, which is shown in longitudinal section, has a nozzle body 1, preferably of aluminum, which at one of its ends changes over into a connecting pipe 2, and to whose other end or terminal portion is fastened a nozzle 3. Body 1 thus forms an angled pipe. The nozzle body is mounted in a housing 4 of thermoplastic material, which serves as a heat-insulating casing and is provided with means for releasably fastening the housing in an opening 11 of hood 5 of the motor vehicle. For this purpose housing 4 is provided with an external circumferential groove 12 engaging the rim of opening 11 and by which the housing and parts carried thereby are supported and releasably retained within the opening. The parts are so disposed upon hood 5 that nozzle 3 may project a spray of fluid onto the windshield of the vehicle, a portion thereof being identified at 13. The nozzle body, which in the assembly of the spray nozzle is inserted in the housing 4, is fixed therein by means of a removable closure element 6. Within a space 7 which is formed by the nozzle body the housing 4 and the closure element 6, is mounted the pill-shaped PTC heating element 8 whose electric connections 9 and 10 pass through the plastic closure element 6 to the outside.

What is claimed is:

1. The combination with the windshield of a motor vehicle, of a spray nozzle assembly mounted upon the vehicle in position to direct a fluid spray onto said windshield said spray nozzle assembly comprising:

a hollow angled pipe having a fluid inlet and a terminal portion at its respective ends, a spray nozzle mounted in said terminal portion, housing means enclosing said pipe and mounting the same on the vehicle such that the fluid spray from said spray nozzle is directed onto the exterior surface of the windshield;

a PTC heating element mounted in said housing means, contiguous to and in heat exchange relation with said nozzle and said pipe;

said housing means forming a chamber with a downwardly-facing opening beneath the nozzle, said heating element being positioned within said chamber, a closure element removably fixed in said housing and closing said downwardly-facing opening, said housing being formed of heat-insulating thermoplastic material and is circumferentially grooved for releasable engagement with the rim of an opening in the hood of the vehicle, said heating element having its temperature-resistance curve rising sharply at or about 0° C with its steepest portion below 50° C.

* * * * *